Figure 1:
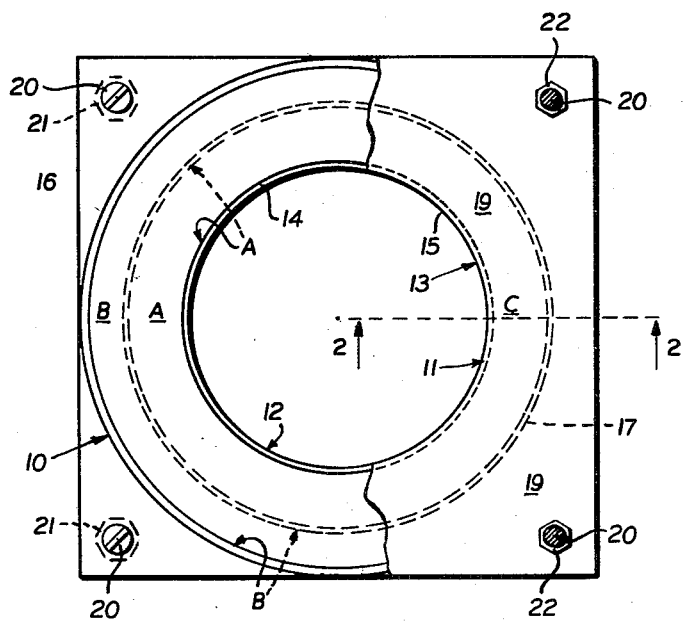

Jan. 12, 1965 M. E. McCLANAHAN 3,165,691
METHOD OF RECOGNIZING INDUSTRIAL WIPING CLOTHS
AND TOWELS BY MAGNETIC DETECTION
Filed Nov. 15, 1961 2 Sheets-Sheet 1

INVENTOR
MAURICE EDWARD McCLANAHAN

BY

ATTORNEY.

INVENTOR.
MAURICE EDWARD McCLANAHAN

ATTORNEY

United States Patent Office 3,165,691
Patented Jan. 12, 1965

3,165,691
METHOD OF RECOGNIZING INDUSTRIAL WIPING CLOTHS AND TOWELS BY MAGNETIC DETECTION
Maurice E. McClanahan, Cleburne, Tex., assignor to Industrial Wiping Cloth Co. Inc., Cleburne, Tex.
Filed Nov. 15, 1961, Ser. No. 152,428
4 Claims. (Cl. 324—41)

This invention relates to an improvement upon known methods of the mutual-inductance balance type for detecting the presence of relatively small quantities of magnetic material, and to apparatus embodying such improvement. The general object of the invention is to provide an improvement and apparatus of this class.

A system of this class, well known in the art, is the "Felici mutual-inductance principle," which, reduced to elementary testing apparatus, usually comprises the following elements.

From a suitable source of alternating current two like leads conduct the bifurcated current in opposite directions to what may be termed the "near" terminals of the primaries of two transformers, or inductors. The two transformers are alike in every respect except that the inductance characteristics of the first transformer are fixed, that the transformers are in reverse of current direct to each other, and that the inductance characteristics of the second transformer may be varied. The "far" terminals of the primaries of these transformers are connected together by a common lead. Of the secondaries of these transformers two of opposite polarity are connected by like leads to the two terminals, respectively, of a null detector, such as a phone. The other ends of these secondaries are connected together by a common lead. The arrangement described above is commonly referred to as the "Felici mutual-inductance balance circuit."

It will be plain that, if the two sides of the circuit are in balance, no current differential can be measured at the detector because the voltages there are equal and opposite. But any imbalance between the two sides will produce current differential at the detector because of unequal, if opposite, voltages. The circuit may therefore operate as a detector of the presence of extraneous magnetic material if such material is brought differentially within the fields of the two transformers, resulting in a differential between the permeability of the fields. To obtain optimum results at the detector, extraneous magnetic material should be introduced as part or all of the core of a particular transformer and kept as far away as practicable from the core of the other transformer; and this, of course, suggests that the transformers have air cores and that the material be made part of or passed through one core only.

While the present invention seeks to improve the Felici mutual-inductance balance circuit, and to provide a simple means for doing this, and undoubtedly suggests a great variety of apparatus and uses based on the improvement, a principal, as well as examplary, object of the invention, is apparatus for detecting a small quantity of magnetic material applied in any suitable manner to a piece of non-magnetic material, such as an industrial wiping cloth. The purpose of suggesting this example is that such wiping cloths naturally become soiled in use and are ultimately desired to be exchanged for clean cloths, and the invention envisages the detector structure to determine whether a piece of cloth discarded into an exchange apparatus is the proper cloth for such exchange for determining the suitability of dispensing a clean cloth of the same class—all such cloths being permanently provided with a detectable quantity of suitable magnetic material, such as an iron or ferrite tracer.

The description of the detector structure for use with an industrial wiping cloth exchange mechanism is in no way a limitation of the invention, but is simply illustrative of the improvement wherein the magnetic material vehicle may be sizable and yet passed conveniently through the inside of, an air-core inductance structure (i.e. a transformer).

This object of the invention will immediately suggest a number of other objects, features, and advantages not only of the particular detector structures disclosed herein but of the obvious modifications of the invention broadly covered by the claims.

Figure 2:
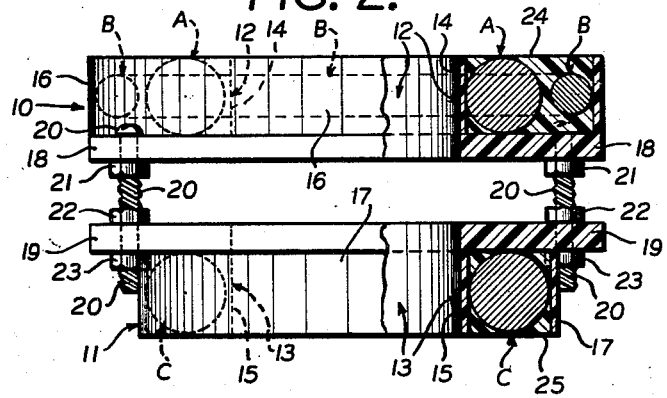
Figure 3:
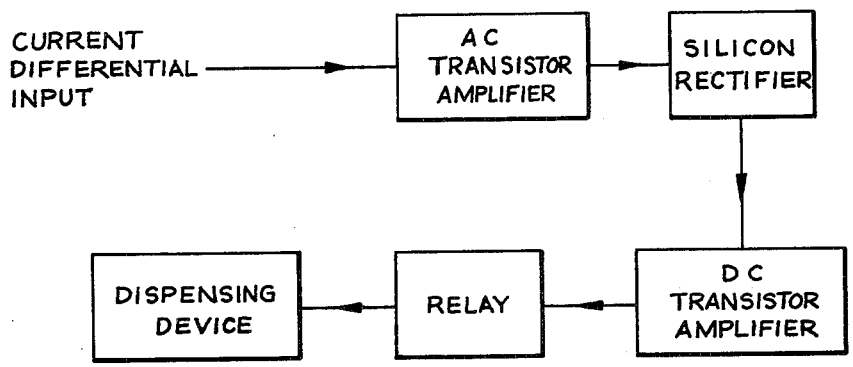

In the drawing:
FIG. 1 is a view directed through the air-core of a detector apparatus built according to the invention.
FIG. 2 is a view at 90° to FIG. 1.
FIG. 3 is a parital block diagram of the circuitry of the present invention.

The figures are partly broken away to the right of the vertical centerline of the sheet and FIG. 2 is further in section to the right of the centerline according to the index 2—2 (dotted line, arrows) of FIG. 1.

The conventional Felici mutual-inductance balance circuit, using two inductances or transformers, requires ideally a high frequency in the circuit if minute quantities of magnetic material (or minute differences in transformer field permeability) are easily to be detected, so that the voltage difference at the detector will be sufficiently large so as to be usable for activating, say, a relay. The way—and slightly an inconvenient way—to meet this requirement is to use frequencies above 1000 cycles. However the expense of using any such frequencies is far more than that of using the readily available 60 cycles of ordinary industrial current. A further disadvantage of employing high frequencies in the conventional circuit is that as the frequency increases so do the reactances of the coils of the transformers or inductances. These reactances are negligible at, say, 60 cycles but are much greater at higher frequencies, and, ultimately, as the frequency increases, these reactances render the circuit useless.

Detection of small quantites, and, particularly minute tracers, of magnetic material with the conventional Felici mutual-induction balance circuit would practicably require, as an ideal, in the case of fairly large vehicles, such as industrial wiping cloths, that the two transformers have air cores through one of which vehicles could pass to entrance the permeability of the field substantially with respect to that of the other. This suggests fairly large pairs of transformer coils, and difficulties in spacing the pairs apart and of balancing the transformers initially Of course one of the transformers need not have an air core, but the difficulties of initial balance would then be even greater. Plainly the Felici circuits spaced and balanced transformers is troublesome if the vehicles are as large as the cloths mentioned above, and, conceivably, uselessly so. And the foregoing statement would appear to be equally apt were an attempt made to use the conventional circuit for detecting hundreds of vehicles other than industrial wiping cloths, or for detecting, sorting, and/or counting a truly prodigious number of vehicles or articles made of iron, steel, nickel, and cobalt.

By the way of recapitulation, the conventional Felici mutual-induction balance circuit used for detecting small amounts of magnetic material increases rapidly in costs as efforts are made to increase sensitivity by increasing frequency-efforts which can ultimately make the circuit unworkable. Next, the use of two conventional spaced transformers tends to require an outsize structure and prohibitive expense; balance is difficult to initiate with large coils and considerable spacing; and, further, the following matter will show that high frequency and two delicately designed and spaced transformers are wholly unnecessary, and that a structure utilizing a portion only of the Felici circuit, large coils, if necessary, and common 60 cycle current at low cost can detect permeability of articles passed through the center orifice of a single, rigid coil structure—which is a sensitive detector and which, by relayed signal, can trigger related machinery to reject, accept, sort, and count any of an almost limitless number of different articles small enough to pass through the orifice mentioned above. Such a structure is one embodiment of the present invention.

The method of the invention, which is analogous to the Felici mutual-induction balance principle in the sense that the present structure is analogous to the circuit, introduces new and useful concepts, while utilizing part of the principle (probably the nearest anticipation in the art of detecting permeable material by using it to bring into imbalance by inductive upset a circuit normally carrying two equal and opposite voltages), but materially simplifying it, and providing flexibility and economy never possessed by the Felici idea.

Theoretically the Felici principle may be reduced to practice in a variety of ways and form and the size of the apparatus, the location of both the source of power and the null indicator are not material; and the form of the two inductances, their structure, and their distance from each other is also immaterial, but the balance problem of the various elements of the circuit must be solved fully (and with usual difficulty), and if the essence of any element is then changed the circuit gets out of balance and remains so until the change is rectified. Any attempt to adapt the principle to the detection of magnetic material in a vehicle of considerable size is fundamentally difficult; and, particularly, where the relatively large vehicle is desired to be passed through the core of one of the inductances, is extremely difficult, and increases in difficulty as the material decreases in volume in ratio to vehicle size. Relatively speaking, the principal is ill-suited to testing either a relatively large vehicle with a tiny tracer in it, and is not much more well-suited to testing relatively large articles of iron, steel, nickel, and cobalt. Of course the fields of the coils of the Felici circuit are both internal and external—extending outwardly indefinitely (while weakening inversely with the cube of the distance), and the fields of the two "independent" pairs of coils overlap; any amount of extraneous permeable material introduced anywhere within one of the fields changes, however slightly, the inductance characteristics. But practicality demands that introduced extraneous magnetic material become as far as possible a part of the actual core, and, where the coils simply enclose (besides non-magnetic material, such as a cardboard winding tube) air, ideally the magnetic material should become as great a part of the (then) permeable core as possible. The former relates really, to every transformer structure imaginable, and to the improvement of the present invention as well as to the Felici principle. But it is this precise fact that makes the principle hard and expensive to apply to large-scale apparatus. The two Felici transformers or inductances have to maintain their physical relationship to each other and they should also be as far apart as possible—not an easy problem to solve with Felici's teaching.

The improvement of the invention first eliminates one of the Felici coils, and, instead of calling for two distantly separated transformers and, possibly, means for holding their physical relationship at a distance intact, calls for three coaxial air-core coils rigidly held in place in a simple frame of no considerable thickness. For example, the detector structure of the invention can produce enough voltage differential upon presentation of, say, an industrial wiping cloth with but a fraction of a gram of magnetic material-woven or sewn into it as a fine metallic thread, or in the form of ferrite in plastic bonded to the cloth, or in ferrite-impregnated ink imprinted onto the cloth, to operate a relay if the common air-core through which the cloth passes has an inside diameter as great as 6¾", with the three coils having, respectively, 100 turns of #17 gauge copper wire and an inside diameter of 6¾", 100 turns of #23 gauge copper wire and an inside diameter of 7⅞", and 200 turns of #23 gauge copper wire and an inside diameter also of 6¾". And, second, the electricity used is the common 60-cycle alternating industrial and house current—current of minimum cost with the most readily available frequency.

In short the greatest disadvantages of the Felici mutual-inductance balance circuit are either minimized or disposed of altogether in a typical embodiment of the improvement of the present invention, as will be shown by the following matter.

Ideally the detector itself, i.e. the actual inductance apparatus as distinguished from the rest of the circuit—which accords with the present method for detecting extraneous magnetic material, that apparently best reacts to the presence of the material, comprises three "air-wound" coils, referred to herein as coils A, B, and C. No two coils are alike. Theoretically all coils should be perfect toroids—a specification which cannot be met absolutely, but which may be met well enough for the purposes of the present invention, without great difficulty.

Coils A and C should have the same inside diameter. Coil A should have X turns of (copper) wire of relatively large cross-section. Coil C should have 2X turns of (copper) wire of relatively small cross-section. (See below.)

Coil B should have an inside diameter only slightly greater than the outside diameter of Coil A. Coil B should have one half as many turns as Coil C of the same kind of wire, or X turns (like Coil A).

The three coils should be rigidly and permanently mounted co-axially together in a suitable non-magnetic frame in such manner that the same coefficient of linkage or coupling exists between Coil A (which is the primary) and Coil B (which may be called the "near" secondary), as one linkage or coupling, and Coil A and Coil C (which may be called the "far" secondary), as another linkage or coupling. The fixed spatial relationship between the three coils should be such that the field generated by the 60-cycle current through Coil A cuts and links both Coils B and C, but Coil B, with X turns, being the "near" secondary, may be placed around the outside of Coil A so as to be quite close thereto, whereby the voltage induced in Coil B is equal to that induced in Coil C, which has twice as many, or 2X turns, but is the "far" secondary placed more distinctly from Coil A.

A most convenient way to arrange the three coils, with the specified inside diameters such as described, and all coils co-axial, is with Coils A and B in a common plane (with, of course, Coil A, the primary, inside Coil B, the "near" secondary), and with Coil C (the "far" secondary) in another plane parallel to the first-mentioned plane and distant therefrom by a specific measure (see below).

Such an arrangement is illustrated in the drawing which shows two views, at 90° from each other—partly broken away and in section—of a detector (alone) designed according to the invention.

This particular embodiment of the detection or inductance apparatus—separate from the rest of the circuit which can be easily understood from the following text without illustration—comprises two ring-shaped channels of suitable insulating structural material, such as any one of a number of plastics, each so positioned that its "bottom" outwardly opposes the "bottom" of the other and so that such "bottoms" are parallel to each other, and that the two channels are co-axial. These channels are indexed 10 and 11; the center orifices, with equal diameters, through the channels are respectively designated 12 and 13; the inner walls of the Channels 14 and 15 respectively; the outer walls thereof 16 and 17 respectively; and the "bottoms" 18 and 19 respectively.

The "bottoms" 18 and 19 are centrally and circularly perforate to accord with the orifices 12 and 13, but their peripheries are square—not round, like the channels, beyond which the "bottoms" extend to form 90° corners. The two channels 10 and 11 are fixedly held away from each other, a certain distance by four adjustment screws 20 and twelve jam nuts 21, 22, and 23 (see below), the screws passing through the "bottoms" of the channels near their corners. In the drawings Coils A, B, and C are indicated as toroids. Coil A is fitted within Channel 10 next to its inner wall 14, which separates the coil from the center orifice 12. Coil B is fitted within Channel 10 next to its outer wall 16, and is barely separated from Coil A. By any suitable means, not shown, Coil B is held slightly away from the "bottom" 18 of the Channel 10 so as to be co-planar with Coil A. Both Coils A and B are sealed into Channel 10 preferably by epoxy 24 filling the rest of the channel. See FIG. 2. Coil C is fitted into Channel 11, and sealed therein preferably also by epoxy 25, filling the rest of the channel. See the same figure.

In assembling the detector the primary Coil A is excited, and the voltages induced in secondaries B and C are independently measured, as with volt-meters, and Channel 11 with Coil C is adjusted to and/or away from Channel 10 with Coils A and B until the readings of B and C are equal. Then by means of the jam nuts 21, 22, and 23, and screws 20, the channels are permanently locked in position.

As part of the invention the "near" secondary Coil B and the "far" secondary Coil C are connected in series polarity opposition whereby, under normal circumstances—where no extraneous magnetic material is present—the induced voltages in Coils B and C will equal and "cancel out" each other. But when even a tiny tracer of magnetic material is passed through the air-core of the detector apparatus, the coefficient of linkage or coupling between the primary Coil A and the "far" secondary Coil C will be increased, thereby increasing the induced voltage in Coil C. Because of the described design of detector apparatus the coefficient of linkage or coupling between Coil A and Coil B, the "near" secondary, is not materially changed by the presence of the extraneous permeable material (these Coils, A and B, are both co-planar and close together). Therefore, in the presence of magnetic material introduced into the air core of the detector the voltage of Coil C is greater than that of Coil B; and the difference, i.e., more than enough oppositional voltage to cancel out the voltage of Coil B, is a quite measurable signal indicative of the presence of unusual permeable material.

Operation with 60-cycle current gives low values for inductance reactance and impedances with the necessary air-wound coils of the present detector apparatus. To avoid the known serious disadvantages that would result from low impedance output from the detector coils vacuum tube amplification is interdicted here. A common-emitter transistor amplifier is used instead, as its low input impedance matches the low output impedance of a detector of the above-described construction. The main disadvantages of 60-cycle operation is therefore materially minimized.

The signal, above-mentioned, resulting from a secondary voltage differential when unusual magnetic material is present at the detector is fed into a transistor A.C. amplifier (as seen in FIGURE 3) through a pair of potentiometers (not shown), one of which is a vernier balance adjustment for Coils B and C; the second is a gain adjustment which controls the overall detection sensitivity. The amplified signal is detected by a silicon rectifier and fed to the base of a transistor D.C. amplifier. The small rectified current from the silicon rectifier is here amplified sufficiently to operate a relay in the collector of the last-mentioned transistor.

The operation of the relay controls any additional operations as may be desired, such as advancing counters, flashing lights, sounding bells, rejecting, etc.

The principal advantages of the present invention are to be found in the low cost, simplified construction, compactness, and usability with common 60-cycle current.

An immediate goal in the development of the present invention was a means for detecting the presence in a (soiled) industrial wiping cloth of a magnetic tracer applied thereto, the purpose of ascertaining the presence of the tracer being to control operation of a dispenser of clean wiping cloths, which dispenser is no part of this invention, and which is desired to dispense a clean cloth only upon establishment of the fact that a soiled cloth of the same category has been discarded, all cloths being marked in the same way with some kind of magnetic tracer.

It was decided, and obviously correctly, that the best way of detecting the tracer was to pass the entire (soiled) cloth through the air-core of an inductance apparatus of the class described. This decision, put into practice, produced apparatus completely satisfactory to the requirements of the immediate job; but it will be plain at once, to those versed in the science of electromagnetic induction, that the present invention is by no means limited to the detection of a magnetic tracer applied to an industrial wiping cloth. The invention may be employed in one modification or another to such a prodigious body of possibly important detection problems that it would be imprudent, here, to pretend that the few of such problems mentioned below even begin to exhaust the possibilities for use of the invention.

For example, the modification of the inductance apparatus of the invention described above and illustrated in the drawing, could, in theory and without change, be used to detect any piece of magnetic material small enough to be passed through the air-core of the apparatus. And, of course, a responsive signal put out by the apparatus and suitably amplified to operate a relay could ultimately control any of a variety of consequent operations. Such operations might include counting permeable objects passed through the air-core; making a signal, such as ringing a bell, flashing a light, or working a semaphore upon the passage of a permeable object through the core; sorting out magnetic objects in general from various objects passed through the core, as well as impermeable objects with magnetic markers from such objects without such markers passed through the core; selectively accepting and/or rejecting from a variety of different objects passed through the core, those having magnetic properties from those without such properties; controlling the operation of any of a variety of machines upon the passage through the core of a ferrite-impregnated portion of a continuously moving plastic tape having such portions alternating with non-impregnated portions, or the passage of each of a series magnetic objects of any other suitable kind; and a presently countless variety of other operations.

And further for example, a modification of the inductance apparatus of the invention together with that of its associated circuit might well be employed not only to detect but to evaluate each of a series of different objects with a variety of magnetic properties passed through the air core of the apparatus or near the air-core of the apparatus.

Magnetic properties might as well read "magnetizable properties," and each phrase indicates ultimately the saturation-load of lines of force of a substance or of a particular object. Not only do magnetite, iron, steel, nickel, cobalt, and a variety of alloys, some without iron, have different magnetic and magnetizable properties as substances, speaking generally, but objects of any one of these substances having different mass also have different characteristics of permeability. Therefore the invention is useful in controlling an operation such as the sorting of products of the same substance but of different mass turned out by, say, a screw machine, or means for manufacturing steel ball bearings. According to the foregoing paragraph the invention is useful in testing samples of ore for permeability characteristics.

For the benefit of those versed in the present art a model of the inductance apparatus of the invention that was actually built and which worked satisfactorily in detecting less than one gram of ferrite employed as a magnetic tracer applied to an otherwise impermeable industrial wiping cloth, and which model has hereinabove been referred to quite sketchily, will be here more specifically described.

The model of inductance apparatus was built substantially according to that shown in the drawing and generally described above. Accordingly, the model has the equivalent of Coils A, B, and C. Coil A had 100 turns of #17 copper magnet wire, the diameter of which is .0453. Coil B had 100 turns of #23 copper magnet wire, the diameter of which is .0226, or one half that of #17 wire except for an error of $1/20,000$ of an inch. And Coil C had 200 turns of #23 wire. The frame in which the coils were fixed in position relative to each other was, of course, non-magnetic, as were the coils themselves; and the distance between the individual frames of the Coils A and B and of Coil C, not the distance between the median planes of Coils A and B (common) and of Coil C, or, in other words, between the nearest parts of Coil A and Coil C relative to each other, was about one inch. Coil A and B were almost as close together as they could be placed. However, the coefficient of linkage between Coil A and Coil B and Coil A and Coil C was common; and, normally, the induced current in Coil C was equal to, and was opposite to, the induced curent in Coil B, and cancelled the latter out. The diameter of the air-core of Coils A and C, through which a wadded, soiled wiping cloth was passed was nearly 6¾". The inside diameters of Coil B was 7⅞" and this coil was placed around the outside of Coil A in plane therewith. Coil A is referred to herein as the "primary," Coil B as the "near secondary," and Coil C as the "far secondary." These appellations are quite in order, for the inductance apparatus was, in fact, a transformer with a primary and two secondaries of such characteristics and relationship to each other that opposite and equal currents were normally induced in the two secondaries. This transformer is of the essence of the invention, and is accordingly claimed herein.

In the transformer art, where ordinary efficiency of induction is sought, the transformer of the present invention, as illustrated in the drawing, might well be said to be of such poor construction that the only way to make it any less efficient would be to substitute bismuth for the air of the core. But for the purpose for which it is intended, the illustrated transformer is the most efficient structure of its class heretofore known.

It is desired to be specifically pointed out that the act of passing a magnetic object through the coils of the transformer is the best known way to change the coefficient of linkage between the primary and the far secondary; and that, accordingly, a preferred structure of the transformer calls for an air-core. But the above-described act is not the only way to change the specified co-efficient of linkage, because the proximity only of a magnetic object would change this coefficient somewhat; and even though proximity only of the permeable material is certainly not wholly desirable, and gives a far weaker current differential between the secondaries, the air-core, however convenient, is not indispensable; and such a core merely represents one type of modification of the invention.

It is further desired to be made clear that a particular number of possible ampere-turns had by any one of the three coils is not a limitation of the essence of the invention. Coil A does not have to be made of wire twice as thick as that of Coils B and C; Coil C does not have to have twice the number of turns of the same kind of wire as Coil B.

The novelty, in essence, of the inductance apparatus, or transformer, of the invention, is that the apparatus has, in fixed physical relationship, a primary, a near secondary, and a far secondary, with the co-efficient of linkage between the primary and near secondary normally equal to that between the primary and far secondary, and with the secondaries connected in series polarity opposition.

What is claimed is:

1. The method of detecting magnetic properties in a wiping cloth or the like having a tracer of magnetic materail, whereby a second wiping cloth is dispensed from a dispensing device when the presence of magnetic material is detected in said first wiping cloth, comprising the steps of passing said first wiping cloth through three fixed air-wound co-axial coils, one of said coils being a primary excited by an alternating current source having a frequency of substantially 60 cycles, another of said coils being co-planar with said first named coil and which is a relatively close secondary, and the third coil being in a plane separate and apart from the first named plane but parallel thereto and which coil is a relatively distant secondary having more turns of wire than said close secondary, both of said secondaries being wound with the same kind of wire, the coefficient of linkage between the primary and the close secondary being normally equal to that between the primary and the distant secondary due to the differences of proximity relative to the primary and the number of turns of the same kind of wire of the close and distant secondaries, the secondaries being connected in series polarity opposition; and amplifying any current differential between the close and distant secondaries as the first wiping cloth is passed therethrough, and employing any amplified current differential to operate an electromagnetic signaling device to dispense said second wiping cloth from said dispensing device.

2. The method of detecting magnetic properties in a wiping cloth or the like having a tracer of magnetic material, whereby a second wiping cloth is dispensed from a dispensing device when the presence of magnetic material is detected in said first wiping cloth, comprising the steps of passing said first wiping cloth through three fixed co-axial coils, one of said coils being a primary excited by an alternating current source having a frequency of substantially 60 cycles, another of said coils being co-planar with said first named coil and which is a relatively close secondary, and the third coil being in a plane separate and apart from the first named plane but parallel thereto and which coil is a relatively distant secondary having more turns of wire than said close secondary, both of said secondaries being wound with the same kind of wire, the coefficient of linkage between the primary and the close secondary being normally equal to that between the primary and the distant secondary due to the differences of proximity relative to the primary and the number of turns of the same kind of wire of the close and distant secondaries, the secondaries being connected in series polarity opposition; and amplifying any current differential between the close and distant secondaries as the distance between the first wiping cloth and said coils is reduced, and employing any amplified current differential to operate an electromagnetic signaling device to dispense said second wiping cloth from said dispensing device.

3. The method of detecting magnetic properties in a wiping cloth or the like having a tracer of magnetic material in accordance with claim 1, wherein the dispensing of said second wiping cloth from said dispensing device is accomplished by feeding said current differential to the input of an A.C. transistorized amplifier, the output of which is rectified by a silicon rectifier and fed to the input of a transistorized D.C. amplifier, the output of said D.C. amplifier being fed to the winding of a relatively sensitive relay, and said relay activating said dispensing device.

4. The method of detecting magnetic properties in a wiping cloth or the like having a tracer of magnetic material in accordance with claim 2, wherein the dispensing of said second wiping cloth from said dispensing device is accomplished by feeding said current differential to the input of an A.C. transistorized amplifier, the output of which is rectified by a silicon rectifier and fed to the input of a transistorized D.C. amplifier, the output of said D.C. amplifier being fed to the winding of a relatively sensitive relay, and said relay activating said dispensing device.

References Cited by the Examiner

UNITED STATES PATENTS

| 1,335,985 | 4/20 | Pozzo et al. | 324—34 |
| 2,237,254 | 4/41 | Broekhuysen | 324—41 |
| 2,790,950 | 4/57 | Miller | 324—34 |
| 2,829,338 | 4/58 | Lord | 324—34 |

WALTER L. CARLSON, *Primary Examiner.*

FREDERICK M. STRADER, *Examiner.*